(12) United States Patent
Nishida

(10) Patent No.: US 8,914,220 B2
(45) Date of Patent: Dec. 16, 2014

(54) ENGINE SYSTEM

(75) Inventor: Hideyuki Nishida, Sunto-gun (JP)

(73) Assignee: Toyota Jidosha kabushiki Kaisha, Toyota (JP)

( * ) Notice: Subject to any disclaimer, the term of this patent is extended or adjusted under 35 U.S.C. 154(b) by 401 days.

(21) Appl. No.: 13/141,820

(22) PCT Filed: Dec. 26, 2008

(86) PCT No.: PCT/JP2008/073711
§ 371 (c)(1),
(2), (4) Date: Jun. 23, 2011

(87) PCT Pub. No.: WO2010/073361
PCT Pub. Date: Jul. 1, 2010

(65) Prior Publication Data
US 2011/0264358 A1    Oct. 27, 2011

(51) Int. Cl.
*B60T 7/12*        (2006.01)
*G05D 1/00*        (2006.01)
(Continued)

(52) U.S. Cl.
CPC .............. *F02D 19/00* (2013.01); *F02D 41/021* (2013.01); *F02D 41/1401* (2013.01); *F02M 25/0228* (2013.01); *F02D 19/081* (2013.01); *F02M 25/0227* (2013.01); *F02D 19/082* (2013.01); *F02M 43/00* (2013.01); *F02M 25/00* (2013.01); *F02B 3/06* (2013.01); *F02B 29/0406* (2013.01); *F02D 41/0025* (2013.01); *F02D 41/0225* (2013.01); *F02D 41/123* (2013.01); *F02D 2200/701* (2013.01); *F02D 2250/18* (2013.01); *F02M 25/0707* (2013.01); *F02M 25/0727* (2013.01); *Y02T 10/36* (2013.01); *F02D 19/0665* (2013.01)
USPC ............ 701/104; 701/103; 477/107; 477/110

(58) Field of Classification Search
CPC .......... F02P 41/0025; F02B 1/04; F02B 1/06; F02B 1/08; F02B 1/10; F02B 47/00; F02B 47/02
USPC ........... 123/1 A, 25 A, 25 E, 25 M, 304, 486, 123/575–578; 477/107, 110; 701/101–104
See application file for complete search history.

(56) References Cited

U.S. PATENT DOCUMENTS 2,681,212 A * 6/1954 Fenley .......................... 261/18.2
6,687,597 B2 * 2/2004 Sulatisky et al. ............. 701/104

(Continued)

FOREIGN PATENT DOCUMENTS

JP    A-57-41461    3/1982
JP    U-57-54654    3/1982

(Continued)

OTHER PUBLICATIONS

Office Action issued in Japanese Application No. 2010-543696 dated Sep. 11, 2012 (with partial translation).

(Continued)

*Primary Examiner* — Hieu T Vo
*Assistant Examiner* — Sherman Manley
(74) *Attorney, Agent, or Firm* — Oliff PLC

(57) ABSTRACT

An engine system includes: a mixture portion capable of mixing a first liquid as a main fuel with a second liquid at a predetermined mixture ratio; an engine to which a mixed fuel produced by mixing the first liquid with the second liquid is fed from the mixture portion; and a control portion controlling the mixture ratio of the mixed fuel to be a target mixture ratio based on a driving state of the engine. The control portion controls the target mixture ratio based on a feeding period from the time when the mixed fuel is fed from the mixture portion to the time when the mixed fuel arrives at the engine.

6 Claims, 16 Drawing Sheets

(51) Int. Cl.
*G06F 7/00* (2006.01)
*G06F 17/00* (2006.01)
*F02D 19/00* (2006.01)
*F02D 41/02* (2006.01)
*F02D 41/14* (2006.01)
*F02M 25/022* (2006.01)
*F02D 19/08* (2006.01)
*F02M 43/00* (2006.01)
*F02M 25/00* (2006.01)
*F02B 3/06* (2006.01)
*F02B 29/04* (2006.01)
*F02D 41/00* (2006.01)
*F02D 41/12* (2006.01)
*F02M 25/07* (2006.01)
*F02D 19/06* (2006.01)

(56) References Cited

U.S. PATENT DOCUMENTS

| | | | | |
|---|---|---|---|---|
| 6,845,608 | B2* | 1/2005 | Klenk et al. | 60/274 |
| 7,275,374 | B2* | 10/2007 | Stewart et al. | 60/601 |
| 7,278,396 | B2* | 10/2007 | Leone et al. | 123/431 |
| 7,287,492 | B2* | 10/2007 | Leone et al. | 123/1 A |
| 7,293,552 | B2* | 11/2007 | Leone et al. | 123/520 |
| 7,302,933 | B2* | 12/2007 | Kerns | 123/431 |
| 7,357,101 | B2* | 4/2008 | Boyarski | 123/1 A |
| 7,406,947 | B2* | 8/2008 | Lewis et al. | 123/478 |
| 7,412,966 | B2* | 8/2008 | Lewis et al. | 123/431 |
| 8,694,186 | B2* | 4/2014 | Syed et al. | 701/22 |
| 2007/0119425 | A1 | 5/2007 | Lewis et al. | |
| 2009/0271090 | A1* | 10/2009 | Surnilla et al. | 701/103 |
| 2009/0320789 | A1* | 12/2009 | Lund | 123/299 |

FOREIGN PATENT DOCUMENTS

| | | |
|---|---|---|
| JP | A-57-181949 | 11/1982 |
| JP | A-61-129428 | 6/1986 |
| JP | A-02-061342 | 3/1990 |
| JP | U-3-112545 | 11/1991 |
| JP | A-6-257479 | 9/1994 |
| JP | A-8-303305 | 11/1996 |
| JP | A-2001-012309 | 1/2001 |
| JP | A-2002-138905 | 5/2002 |
| JP | A-2002-138906 | 5/2002 |
| JP | A-2002-202015 | 7/2002 |
| JP | A-2003-254107 | 9/2003 |
| JP | A-2008-223493 | 9/2008 |

OTHER PUBLICATIONS

Apr. 28, 2009 Search Report issued in International Application No. PCT/JP2008/073711 (with Translation).

European Search Report dated Sep. 26, 2013 issued in European Patent Application No. PCT/JP2008073711.

* cited by examiner

ENGINE SYSTEM

TECHNICAL FIELD

The present invention relates to an engine system.

BACKGROUND ART

There is known an engine using mixed fuel produced by mixing fuel with water. Patent Document 1 discloses a technique to control a mixture ratio of water to fuel to be a target mixture ratio in response to an accelerator opening degree. The mixture ratio is controlled according to the accelerator opening degree, thereby satisfying both emission and drivability.

[Patent Document 1] Japanese Patent Application Publication No. 2002-138905.

DISCLOSURE OF THE INVENTION

Problems to be Solved by the Invention

However, even if the mixture ratio is controlled to be the target mixture ratio, the mixed fuel mixed at the target mixture ratio is not supplied to the engine immediately. For this reason, even if the mixture ratio is controlled to be the target mixture ratio, drivability or emission might be degraded.

It is an object of the present invention to provide an engine system which can supply a mixed fuel mixed at a desired mixture ratio to an engine at the timing suitable for a driving state of the engine.

Means for Solving the Problems

The above object is achieved by an engine system characterized by including: a mixture portion capable of mixing a first liquid as a main fuel with a second liquid at a predetermined mixture ratio; an engine to which a mixed fuel produced by mixing the first liquid with the second liquid is fed from the mixture portion; and a control portion controlling the mixture ratio of the mixed fuel to be a target mixture ratio based on a driving state of the engine, wherein the control portion controls the target mixture ratio based on a feeding period from the time when the mixed fuel is fed from the mixture portion to the time when the mixed fuel arrives at the engine.

The target mixture ratio is controlled based on the feeding period of the mixed fuel, whereby the mixed fuel mixed at a desired mixture ratio is supplied to the engine at the timing suitable for a driving state of the engine.

Effects of the Invention

According to the present invention, it is possible to provide the engine system which can supply a mixed fuel mixed at a desired mixture ratio to an engine at the timing suitable for a driving state of the engine.

BEST MODES FOR CARRYING OUT THE INVENTION

In the following, an intake device of an internal combustion engine in the embodiment according to the present invention will be described with reference to the drawings.

Figure 1:
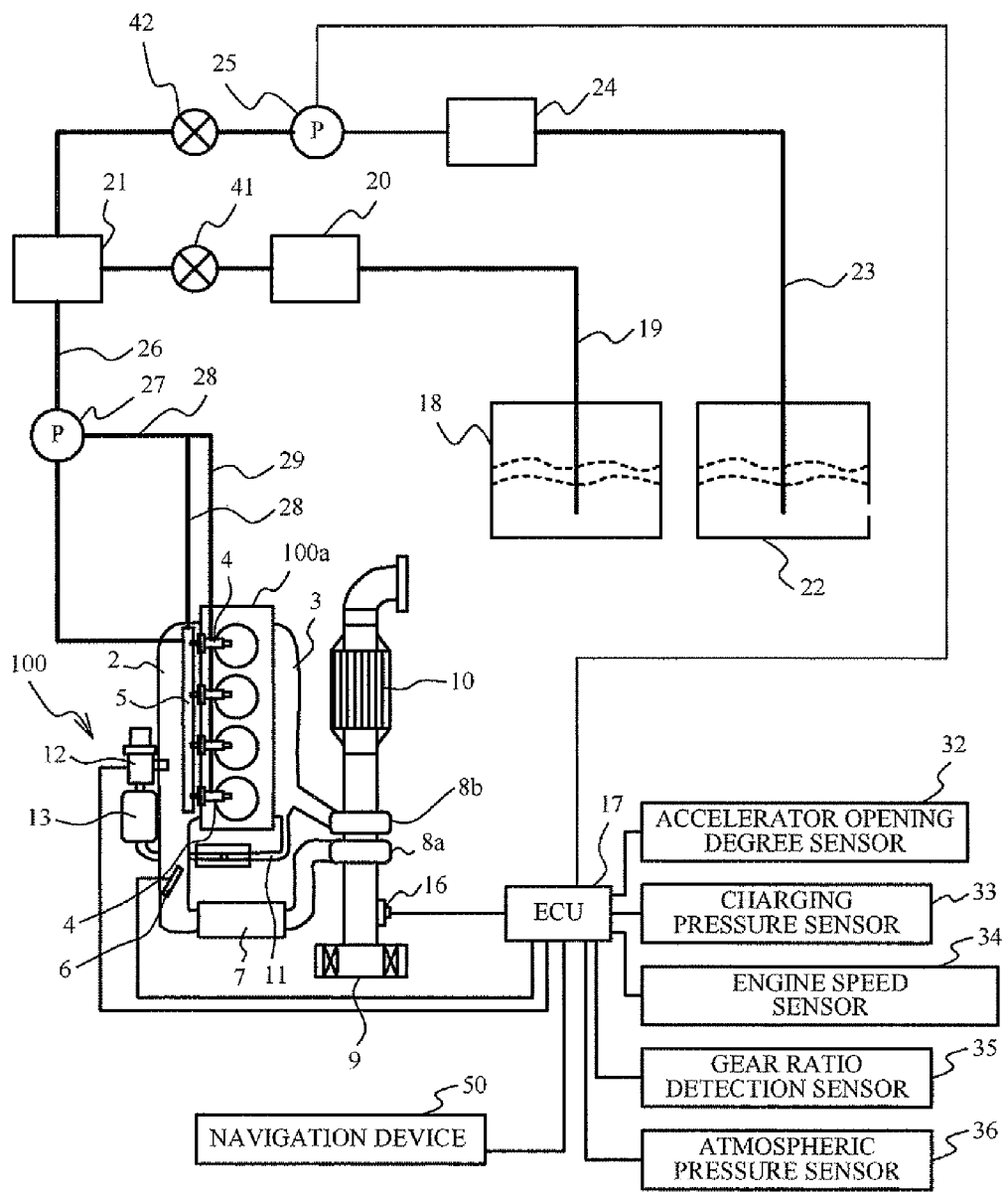
FIG. 1 is a configuration diagram of an engine system.

FIG. 1 is a configuration diagram of an engine system. The engine system includes an engine 100. The engine 100 is a diesel engine with four cylinders.

The engine 100 can be driven by not only a single type of fuel but also mixed fuel mixed with water. For example, the main fuel is light oil, and the mixed fuel produced by mixing the light oil with water is called emulsion fuel. In the embodiment, the light oil is employed as a first liquid, and water is employed as a second liquid. Additionally, the second liquid may be ethanol, that is, alcohol. The second liquid may be the liquid generated by mixing ethanol with water. The first liquid may be gasoline.

The engine 100 has an engine main body 100a. The engine main body 100a is provided with an intake manifold 2 and an exhaust manifold 3. The engine main body 100a has fuel injection valves 4 for each ejecting the fuel to a cylinder. Also, a common rail 5 is provided for supplying a high pressure fuel to each fuel injection valve 4. The intake manifold 2 is connected to an air cleaner 9 through an intake throttle valve 6, an intercooler 7, a compressor 8a of an exhaust turbocharger 8. The exhaust manifold 3 is connected to an exhaust clean device 10 through an exhaust turbine 8b of the exhaust turbocharger 8.

The intake manifold 2 and the exhaust manifold 3 are connected to each other through an EGR passage 11. An EGR control valve 12 and an EGR cooler 13 are arranged in this EGR passage 11.

The engine system is equipped with a tank 18 for retaining the light oil and a tank 22 for retaining water. The engine system is equipped with a mixing tank 21 where the mixed fuel is produced by mixing the light oil with water. The mixing tank 21 and the tank 18 are communicated to each other via a first supply pipe 19. The mixing tank 21 and the tank 22 are communicated to each other via a second supply pipe 23. A first filter 20 and a flow control valve 41 are provided in the first supply pipe 19. A second filter 24, an electric pump 25, and a flow control valve 42 are provided in the second supply pipe 23. The tanks 18 and 22, the mixing tank 21, and the flow control valves 41 and 42 correspond to a mixture portion capable of mixing a first liquid as a main fuel with a second liquid at a predetermined mixture ratio. The mixture ratio is a volume ratio of water to the light oil which are mixed within the mixing tank 21.

Additionally, the mixing tank 21 may be connected to a tank which retains an emulsifier. The emulsifier has an effect of enhancing affinity between fuel and water. Further, a mechanism for stirring the fuel and water may be provided within the mixing tank 21.

The mixing tank 21 and the common rail 5 are communicated to each other via a third supply pipe 26. A high pressure fuel pump 27 is provided in the third supply pipe 26. The high pressure fuel pump 27 is driven by a crank shaft of the engine 100 as a driving source. The high pressure fuel pump 27 pressure-feeds the mixed fuel generated within the mixing tank 21 to the common rail 5. The third supply pipe 26 has a function to feed and supply the mixed fuel to the engine 100.

A return pipe 28 is provided between the common rail 5 and the high pressure fuel pump 27. A return pipe 29 is provided between each fuel injection valve 4 and the high pressure fuel pump 27. The return pipes 28 and 29 are joined to each other on the way. The return fuel from the common rail 5 or each fuel injection valve 4 is returned to the mixing tank 21 by the high pressure fuel pump 27.

The engine system has the air cleaner 9 through which intake air passes and an airflow meter 16 which detects an intake air quantity.

An Electronic Control Unit (ECU) 17 includes a Central Processing Unit (CPU), a Read Only Memory (ROM), a Random Access Memory (RAM), and the like, and controls the operation of the whole engine system.

The ECU 17 is electrically connected to the intake throttle valve 6, the electric pump 25, and the airflow meter 16. Further, the ECU 17 is electrically connected to an accelerator opening degree sensor 32, a charging pressure sensor 33, an engine speed sensor 34, a gear ratio detection sensor 35, and an atmospheric pressure sensor 36. The gear ratio detection sensor 35 detects a gear ratio of a transmission (not illustrated). Additionally, the transmission may be an automatic transmission which automatically changes a gear ratio. The transmission may change a gear ratio according to the operation of a shift lever.

The ECU 17 is electrically connected to a navigation device 50. The ECU 17 can obtain information on an inclination of a road and a curvature of a road based on output signals from the navigation device 50. Moreover, the navigation device 50 calculates the information on the inclination of the road and the curvatures of the road based on GPS signals received by the navigation device 50.

The ECU 17 can control the flow control valves 41 and 42 to control the amount of light oil and water supplied to the mixing tank 21. That is, the ECU 17 can control a mixture ratio of water to the light oil. Thus, the mixed fuel at a mixture ratio set by the ECU 17 is produced within the mixing tank 21.

Figure 2:
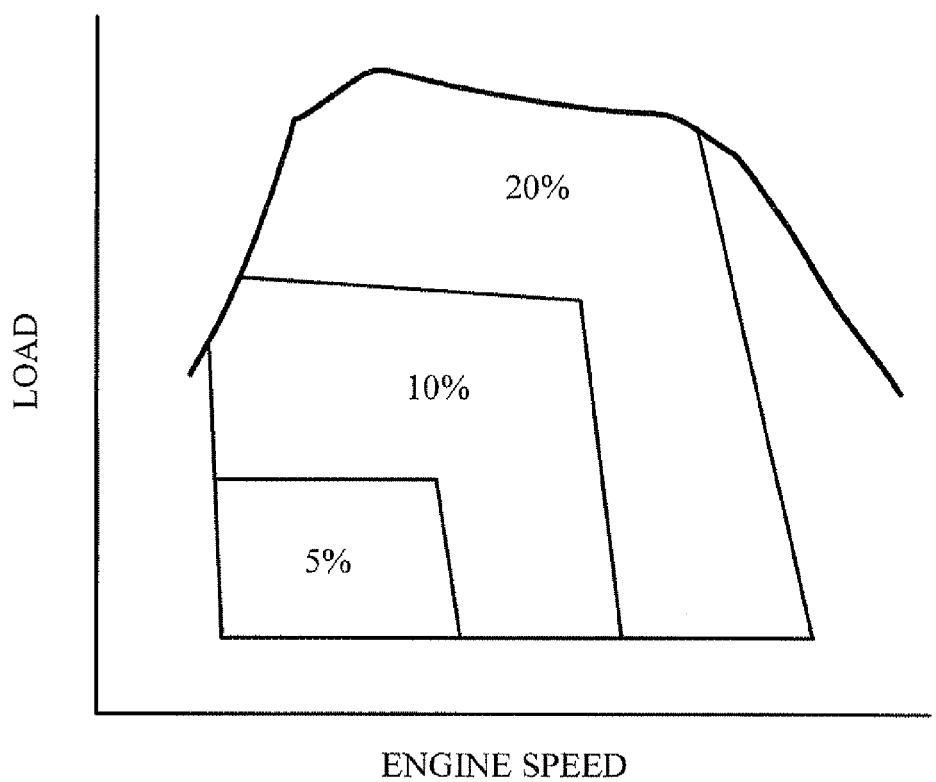
FIG. 2 is a map defining a mixture ratio.

FIG. 2 is a map defining a target mixture ratio. This map is stored beforehand in the ROM of the ECU 17. The target mixture ratio is controlled in response to the driving state of the engine, specifically, the engine speed and the engine load. As illustrated in FIG. 2, the target mixture ratio is defined to be increased as the engine load or the engine speed becomes higher.

Figure 3:
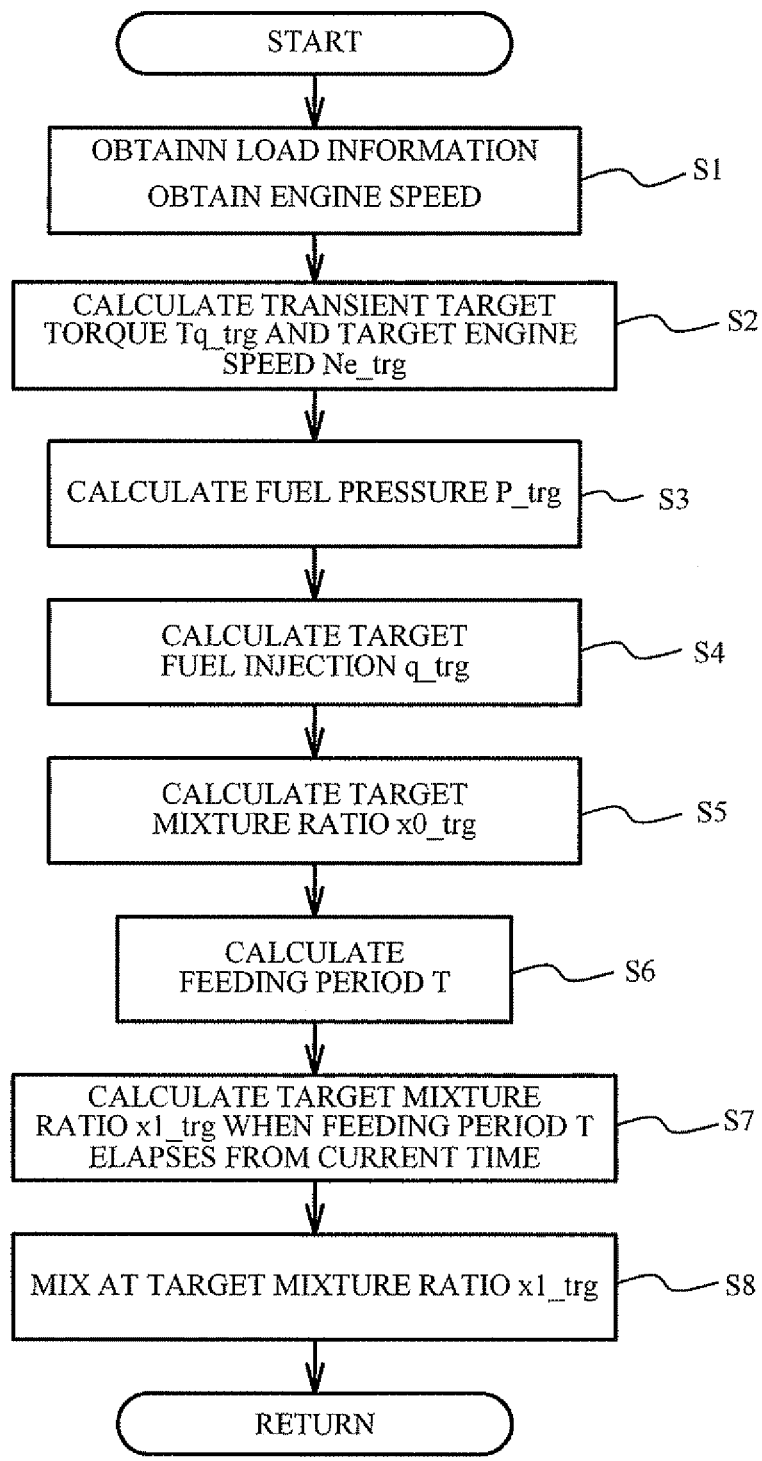
FIG. 3 is a flowchart illustrating an example of a fuel supply control performed by an ECU.
Figure 4:
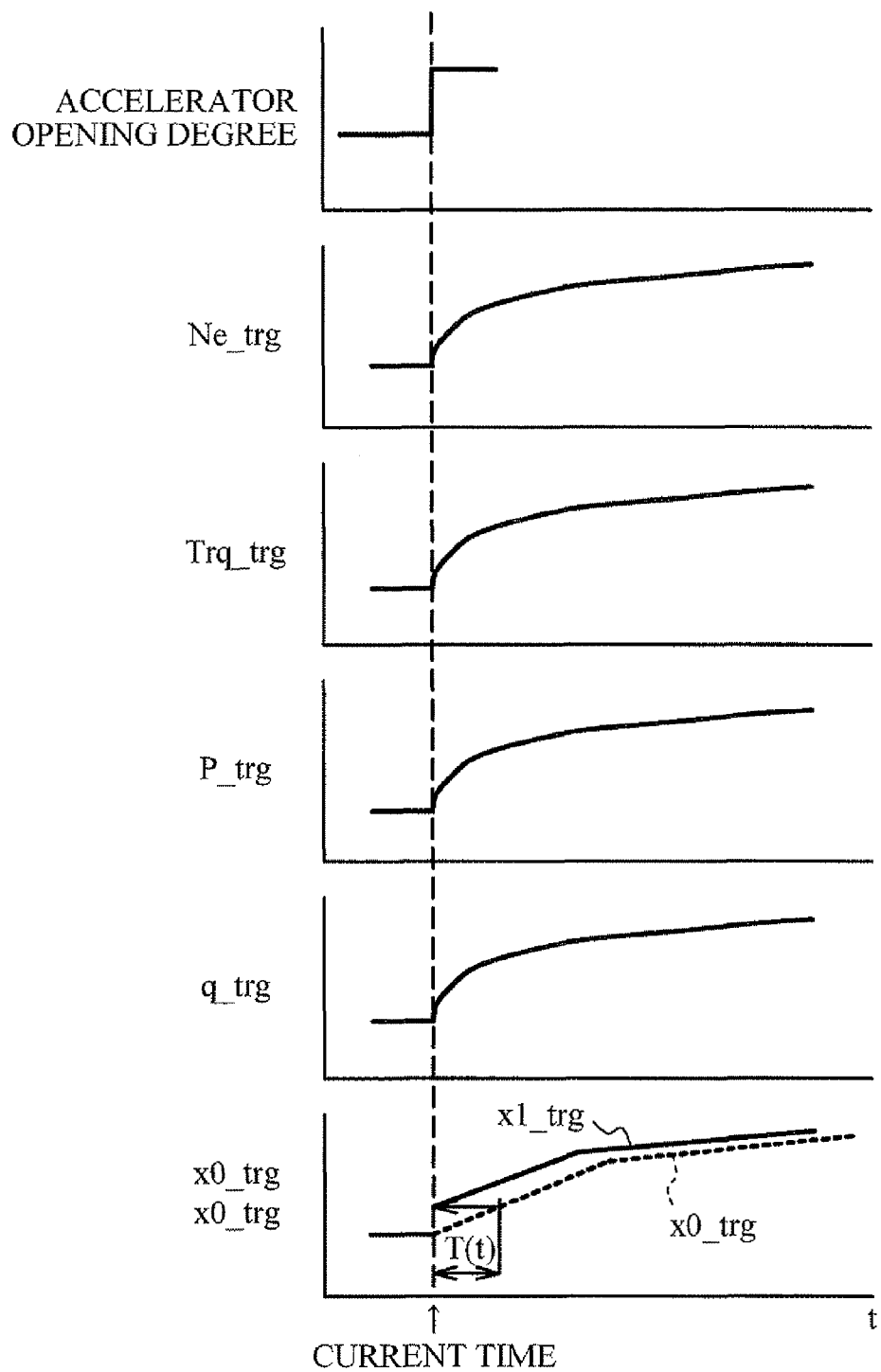
FIG. 4 is an illustrative view of a timing chart at the time of accelerating.

An example of the fuel supply control performed by the ECU 17 will be described. FIG. 3 is a flowchart of an example of the fuel supply control performed by the ECU 17. FIG. 4 is a timing chart at the time of accelerating. An accelerator opening degree, a target engine speed Ne_trg, a transient target torque Tq_trg, a target fuel pressure P_trg, q_trg, a target mixture ratio x0_trg, a target mixture ratio x1_trg are illustrated sequentially from the top in FIG. 4.

The ECU 17 obtains load information of the engine 100 and the engine speed Ne (step S1). The load information is calculated based on values obtained by the accelerator opening degree sensor 32, the charging pressure sensor 33, and the airflow meter 16. The engine speed Ne is obtained from the engine speed sensor 34.

The ECU 17 calculates the transient target torque Tq_trg and the target engine speed Ne_trg based on Ne and the load information (step S2). For example, at the time of accelerating as illustrated in FIG. 4, the transient target torque Tq_trg and the target engine speed Ne_trg are gradually increased by an increase in the accelerator opening degree. An actual engine speed and an actual engine torque converge gradually with the transient target torque Tq_trg and the target engine speed Ne_trg corresponding to the accelerator opening degree.

Figure 5:
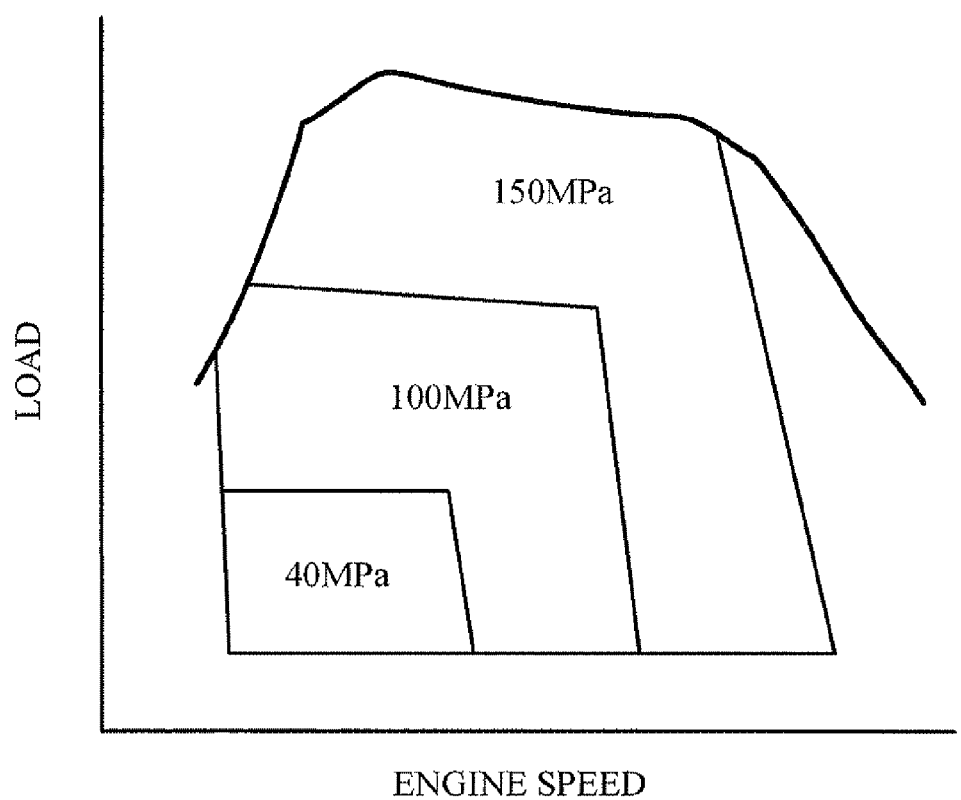
FIG. 5 is an illustrative view of a map defining a target fuel pressure.

Next, the ECU 17 calculates the target fuel pressure P_trg based on the transient target torque Tq_trg and the target engine speed Ne_trg (step S3). Specifically, the ECU 17 calculates the target fuel pressure P_trg based on a map illustrated in FIG. 5. FIG. 5 is an illustrative view of the map defining the target fuel pressure. The target fuel pressure is defined in response to the engine speed and the engine load. This map is stored beforehand in the ROM of the ECU 17. The transient target torque Tq_trg is calculated as the engine load. The fuel pressure is set to be increased as the engine speed and the load increase. Additionally, the fuel pressure is a pressure of the fuel retained within the common rail 5, and is also a pressure of the fuel injected from the fuel injection valve 4.

The ECU 17 calculates the target fuel injection quantity q_trg (mm3/st) based on the transient target torque Tq_trg, the target engine speed Ne_trg, and the target fuel pressure P_trg (step S4).

The ECU 17 calculates the target mixture ratio x0_trg based on the transient target torque Tq_trg and the target engine speed Ne_trg (step S5). Specifically, the ECU 17 calculates based on the map illustrated in FIG. 2.

The ECU 17 calculates the feeding period T (sec) of the mixed fuel based on the target engine speed Ne_trg and the target fuel injection quantity q_trg (step S6). The feeding period T is a period from the time when the mixed fuel is fed from the mixing tank to the time when the mixed fuel arrive at the fuel injection valve 4. The feeding period T is calculated by the following formula.

$$T = V/(q\_trg \times 2 \times cyl/2 \times Ne\_trg/60) \quad (1)$$

V stands for a volume ($mm^3$) of the fuel filled in the passage from the mixing tank 21 to the fuel injection valve 4. cyl stands for the number of the cylinders. Additionally, the above formula (1) is applied to four-stroke engines. In case of two-stroke engines, the feeding period T calculated by the above formula (1) is divided by two, thereby calculating the feeding period in the two-stroke engines.

The ECU 17 calculates the target mixture ratio when the feeding period T elapses from the current time (step S7). Specifically, the ECU 17 estimates the estimated engine speed and the estimated engine load when the feeding period T elapses from the current time. Subsequently, the ECU 17 calculates the mixture ratio corresponding to the estimated engine speed and the estimated engine load based on the map illustrated in FIG. 2, and the calculated mixture ratio is set to the target mixture ratio x1_trg.

In other words, the ECU 17 calculates the target mixture ratio x1_trg in consideration of the feeding period T based on the target mixture ratio x0_trg without the consideration of the feeding period T.

Next, the ECU 17 performs the mixture at the above target mixture ratio x1_trg (step S8). Specifically, the ECU 17 controls the opening degrees of the flow control valves 41 and 42 to control the mixture ratio of the mixed fuel generated within the mixing tank 21 to be the target mixture ratio x1_trg.

As illustrated in FIG. 4, the curve line indicating the target mixture ratio x1_trg is obtained by moving the curve line indicating the target mixture ratio x0_trg in parallel by the period of the feeding period T only.

In this way, the ECU 17 can control the target mixture ratio in consideration of the feeding period T. That is, the ECU 17 estimates the driving state of the engine 100 at the time when the feeding period T elapses from the current time in consideration of the feeding time T while the fuel is delayed in feeding. Next, the ECU 17 controls the mixture ratio to be the target mixture ratio suitable for the estimated driving state of the engine 100. Therefore, the mixed fuel generated at the desired mixture ratio can be supplied to the engine 100 at the timing suitable for the driving state of the engine 100. This prevents drivability or emission from being degraded.

Figure 6:
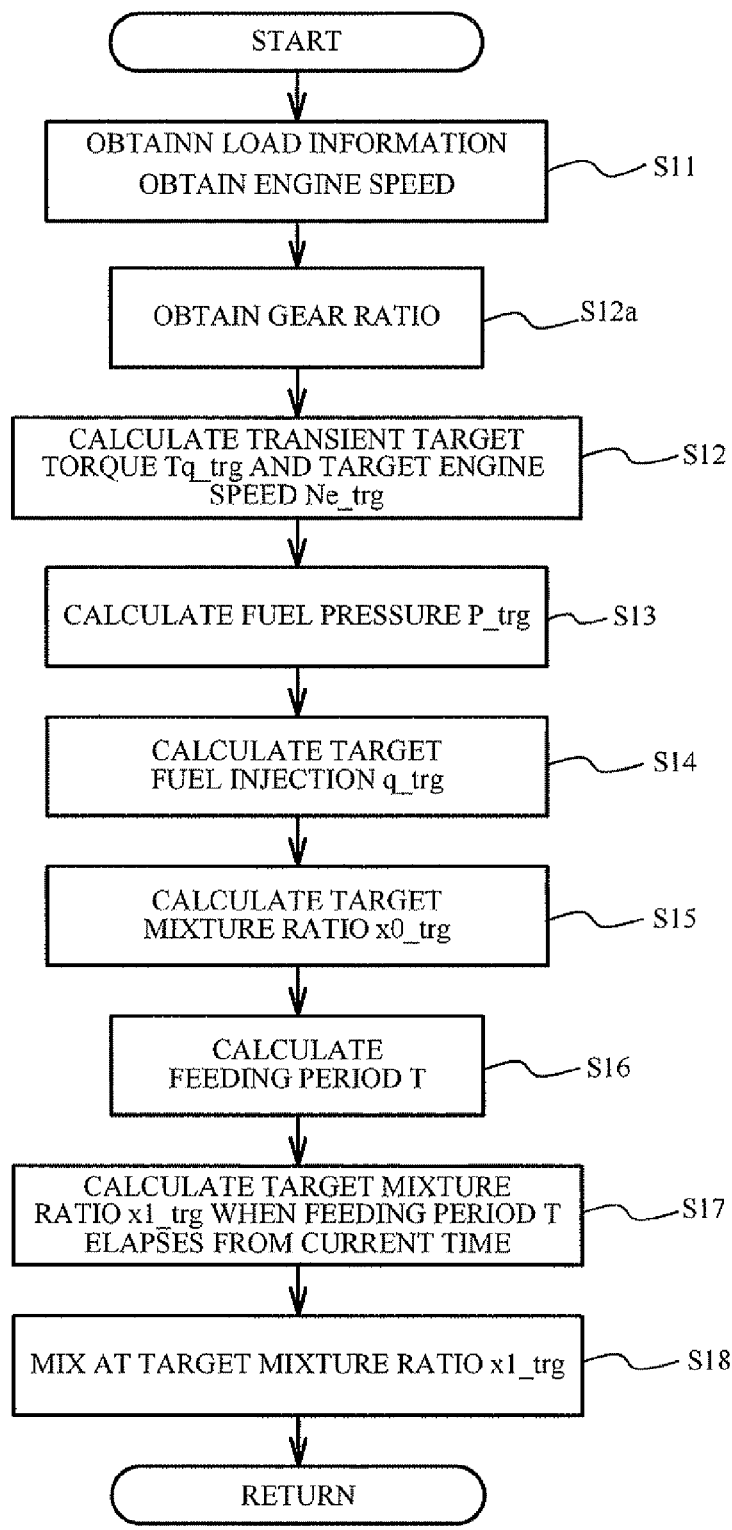
FIG. 6 is a flowchart of a first variation of the fuel supply control performed by the ECU.

Next, a first variation of the fuel supply control performed by the ECU 17 will be described. FIG. 6 is a flowchart of the first variation of the fuel supply control performed by the ECU 17.

The ECU 17 obtains a current gear ratio based on output signals from the gear ratio detection sensor 35 after performing the process in the step S11 (step S12a). The ECU 17 calculates the transient target torque Tq_trg and the target engine speed Ne_trg based on this gear ratio (step S12). After that, the ECU 17 performs the processes in steps S13 to S18. Additionally, the processes in steps S13 to S18 are substantially the same as the processes in steps S3 to S8.

Figure 7:
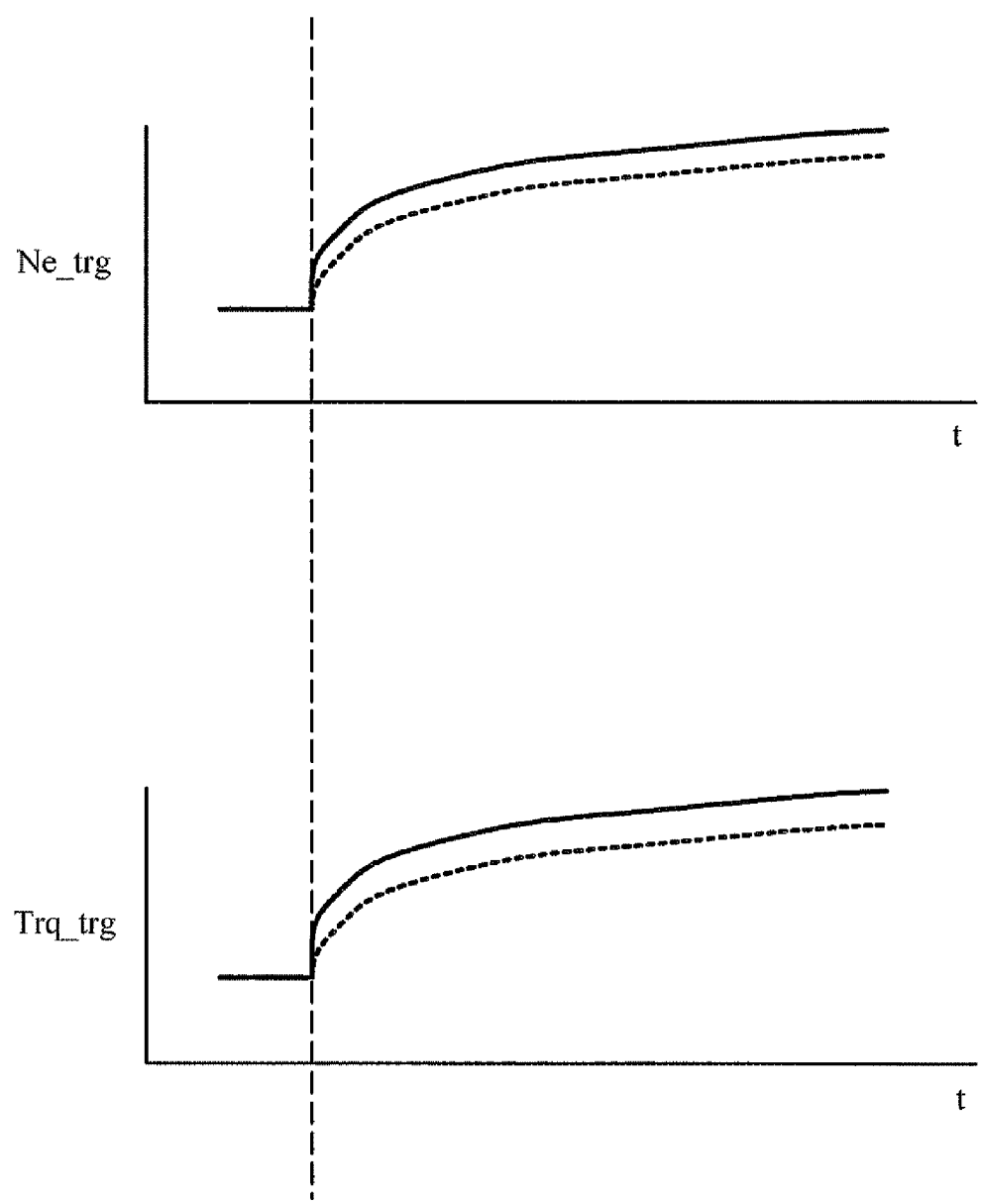
FIG. 7 is a timing chart illustrating a transient target torque and a target engine speed calculated by the ECU in cases where gear ratios are different.

A description will be given of a reason why the transient target torque Tq_trg and the target engine speed Ne_trg are calculated based on the gear ratio. FIG. 7 is a timing chart of the transient target torque Tq_trg and the target engine speed Ne_trg calculated by the ECU 17 in cases where the gear ratios are different. In FIG. 7, solid lines indicate the transient target torque Tq_trg and the target engine speed Ne_trg in cases where the gear ratio is high, and dotted lines indicate the transient target torque Tq_trg and the target engine speed Ne_trg in cases where the gear ratio is low. In other words, the cases where the gear ratio is high are cases where the shift lever is in the low position. The cases where the gear ratio is low are cases where the shift lever is in the high position.

In cases where the gear ratio is high as compared with the cases where the gear ratio is low, even when the accelerator opening degrees are the same, the engine speed and the engine load are readily increased. As illustrated in FIG. 2, the target mixture ratio is controlled dramatically as the engine speed and the engine load are greater. Even if the target mixture ratio in this case is any one of the target mixture ratio x0_trg in consideration of the feeding period T and the target mixture ratio x1_trg without the consideration of the feeding period T, the target mixture is controlled dramatically as the engine speed and the engine load are greater.

Thus, in cases where the driving conditions except for the gear ratios are the same, the ECU 17 controls the mixture ratio to be increased as the gear ratio is higher. Therefore, the mixture ratio is controlled in consideration of the driving state of the engine 100, thereby preventing the emission from being degraded.

Further, in the first variation of the fuel supply control, the gear ratio may be detected by a sensor detecting the position of the shift lever.

Figure 8:
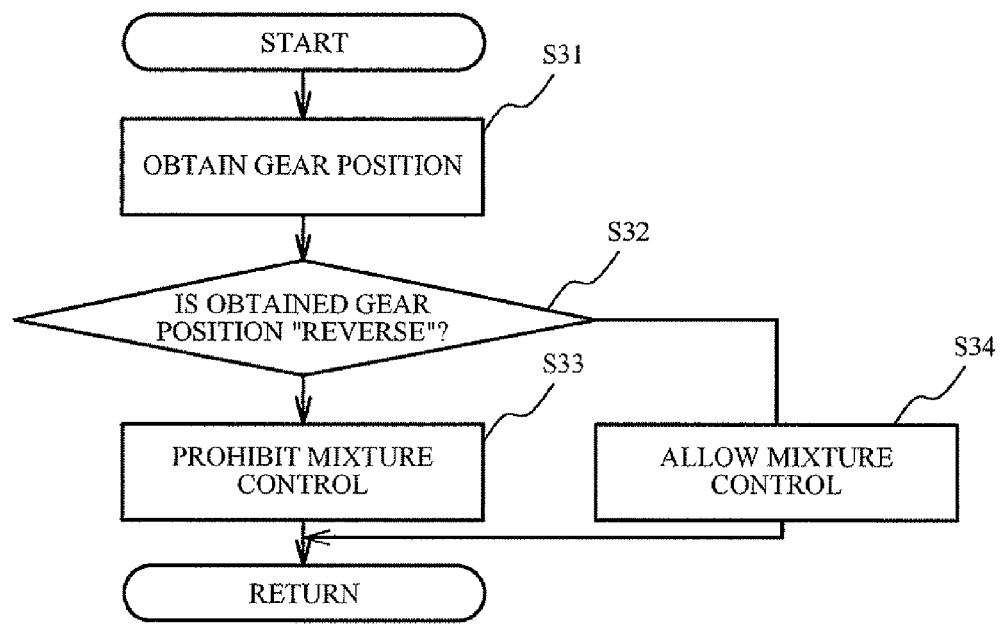
FIG. 8 is a flowchart of a second variation of the fuel supply control performed by the ECU.

Next, a second variation of the fuel supply control performed by the ECU 17 will be described. FIG. 8 is a flowchart of the second variation of the fuel supply control performed by the ECU 17.

The ECU 17 obtains a gear position based on the output from the gear ratio detection sensor 35 (step S31), and determines whether or not the transmission is in the reverse state (step S32). When a negative determination is made, the mixture control mentioned above is allowed (step S34).

When the transmission is in the reverse state, the ECU 17 controls the mixture ratio to be zero (step S33). That is, when the position of the shift lever is in the reverse position, the ECU 17 does not mix the light oil with water. The reason will be described below.

When the transmission is in the reverse state, a travel distance is comparatively short. For this reason, there are little effect in improvement of the emission by mixing the light oil with water. Moreover, when the transmission is in the reverse state, the engine 100 might be stopped afterward. In the cases where the transmission is in the reverse state and the engine 100 is stopped afterward, the mixed fuel is not injected into the cylinders just before the engine 100 is stopped. It is therefore possible to reduce a period for the flushing control performed just before the engine 100 is stopped. This can prevent the degradation of the mileage associated with the flushing control. Additionally, in the flushing control, the engine is driven by only the main fuel before the engine is stopped in order to remove the mixed fuel remained within the cylinders.

Further, in the second variation of the fuel supply control, whether or not the transmission is in the reverse state may be detected by a sensor for detecting the position of the shift lever.

Figure 9:
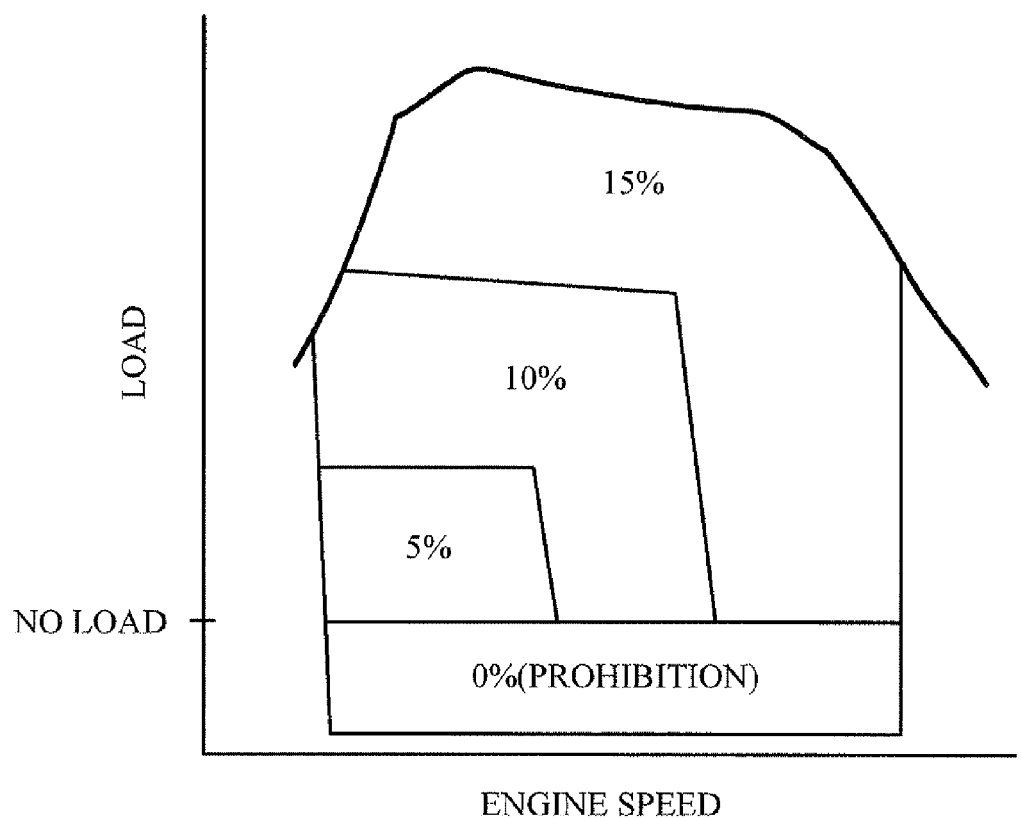
FIG. 9 is a map defining the mixture ratio.

Next, a third variation of the fuel supply control performed by the ECU 17 will be described. FIG. 9 is a map defining the mixture ratio. As illustrated in FIG. 9, the ECU 17 controls the target mixture ratio to be zero when no load is applied to the engine. In other words, when the engine 100 decelerates, the ECU 17 sets the target mixture ratio to be zero. This is because there is a high possibility that the engine 100 is stopped after deceleration. This can reduce the period for the flushing control.

Next, a fourth variation of the fuel supply control performed by the ECU 17 will be described. When the fuel cut is estimated, the ECU 17 sets the target mixture ratio to be zero. Thus, water is not included in the fuel fed to the engine 100 just before the fuel cut. It is highly possible to stop the engine after the fuel cut, thereby reducing the period for the flushing control performed when the engine is stopped. Further, the ECU 17 estimates the fuel cut based on changes in the engine speed, the engine load, the acceleration, and the accelerator opening degree.

Figure 10:
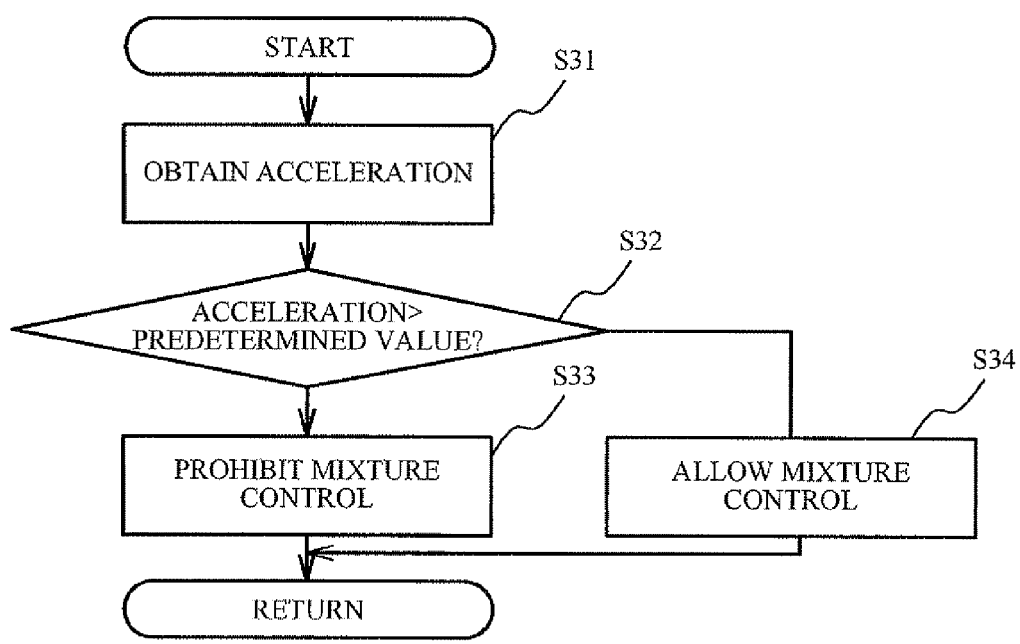
FIG. 10 is a flowchart of a fifth variation of the fuel supply control performed by the ECU.

Next, a fifth variation of the fuel supply control performed by the ECU 17 will be described. FIG. 10 is a flowchart of the fifth variation of the fuel supply control performed by the ECU 17.

The ECU 17 obtains the acceleration per a predetermined time (step S41). Specifically, the ECU 17 obtains the acceleration based on output signals from the accelerator opening degree sensor 32. The ECU 17 determines whether or not the acceleration is more than a predetermined value (step S42).

When the acceleration is less than the predetermined value, the ECU 17 allows the mixture control mentioned above (step S44).

When the acceleration is more than the predetermined value, the ECU 17 controls the target mixture ratio to be zero (step S43). This reason is as follows. At the time of abrupt acceleration such that the acceleration is more than the predetermined value, the target mixture ratio is controlled to be zero, thereby preventing the torque from reducing at abrupt acceleration. Also, at the time of the abrupt acceleration, the engine load increases rapidly. This might degrade the calculation accuracy of the target engine torque and the target engine speed. For this reason, it might be difficult to finely control the target mixture ratio.

Further, the acceleration may be detected by an acceleration sensor.

Figure 11:
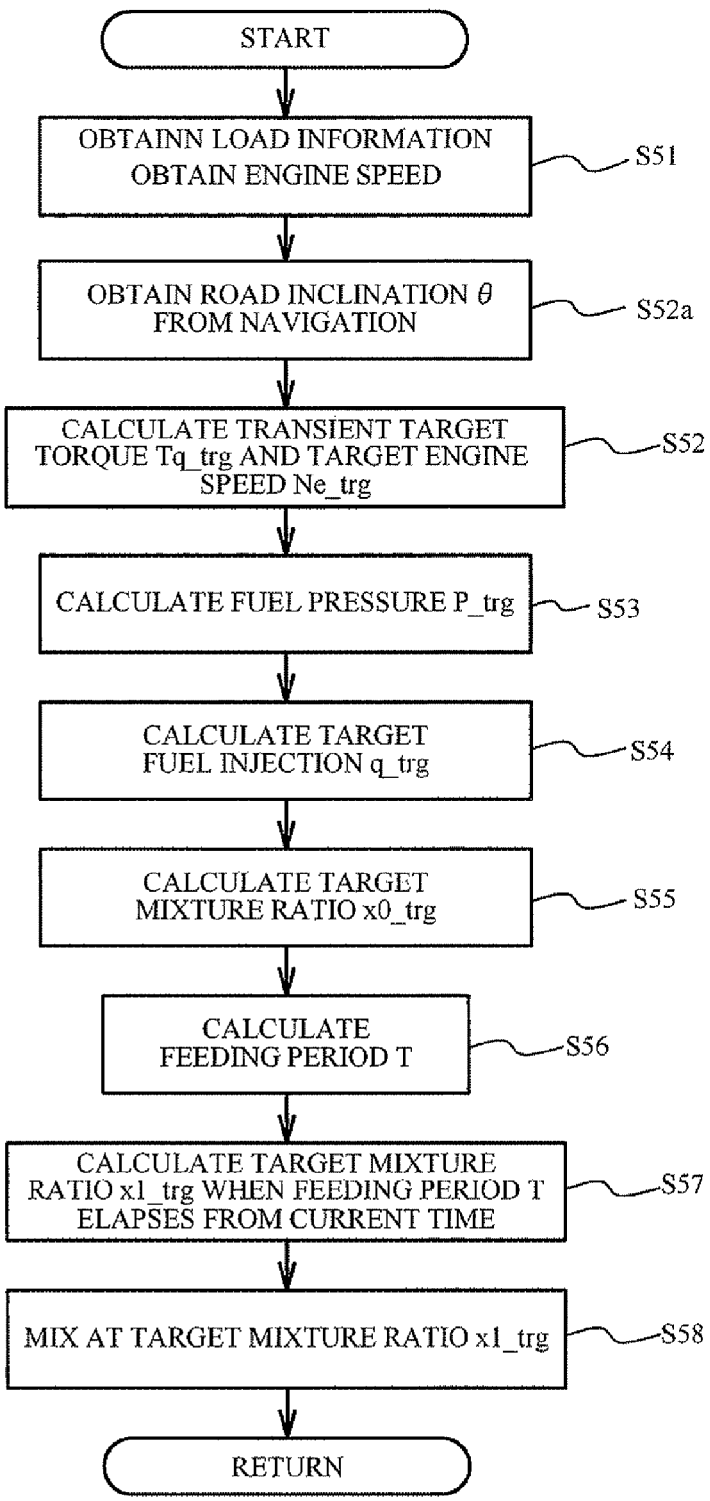
FIG. 11 is a flowchart of a sixth variation of the fuel supply control performed by the ECU.

Next, a sixth variation of the fuel supply control performed by the ECU 17 will be described. FIG. 11 is a flowchart of the sixth variation of the fuel supply control performed by the ECU 17.

The ECU 17 obtains a road inclination $\theta$ based on the information from the navigation device 50 after performing the process in step S51 (step S52a). Next, the ECU 17 calculates the transient target torque Tq_trg and the target engine speed Ne_trg based on the road inclination $\theta$, the engine speed Ne, and the load information (step S52). After that, the ECU 17 performs the processes in steps S53 to S58.

Figure 12:
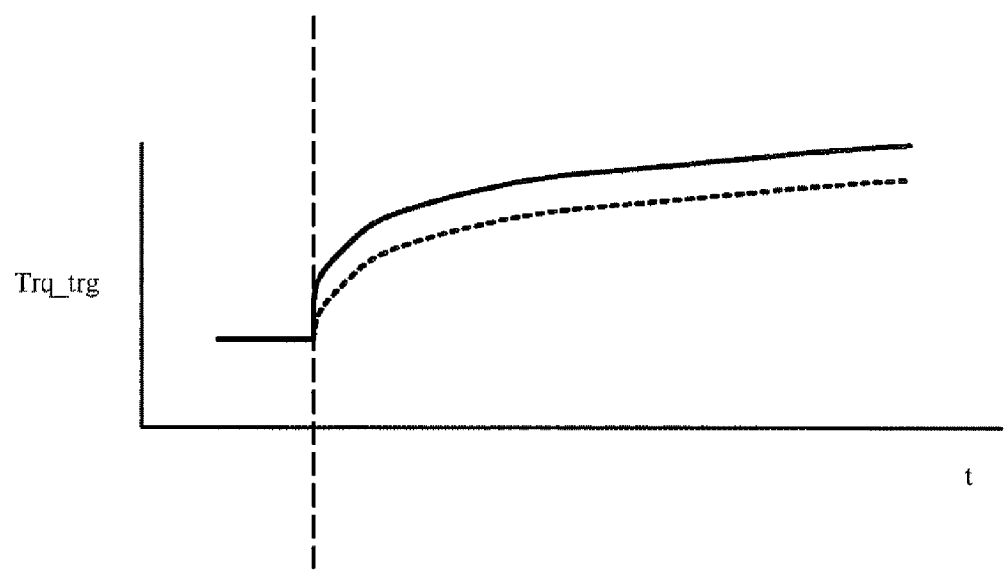
FIG. 12 is a timing chart illustrating the transient target torque calculated by the ECU in cases where road inclinations are different.

FIG. 12 is a timing chart illustrating the transient target torque Tq_trg calculated by the ECU 17 in cases where the road inclinations $\theta$ are different. Additionally, FIG. 12 illustrates cases where the road inclination $\theta$ is an uprising inclination. In FIG. 12, the solid line indicates the case where the road inclination $\theta$ is high, and the dotted line indicates the case where the road inclination $\theta$ is low. In such a way, a greater transient target torque Tq_trg is calculated greatly as the road inclination $\theta$ is higher. The ECU 17 controls the target mixture ratio to be increased as the calculated transient target torque Tq_trg is higher. In this manner, the transient target torque Tq_trg is calculated in consideration of the road inclination $\theta$, thereby improving the accuracy of calculating the transient target torque Tq_trg. This also improves the accuracy of calculating the target mixture ratio, thereby preventing the emission from being degraded. Further, in case of descending inclination, the ECU 17 calculates the transient target torque Tq_trg to be decreased as the road inclination $\theta$ is higher.

Figure 13:
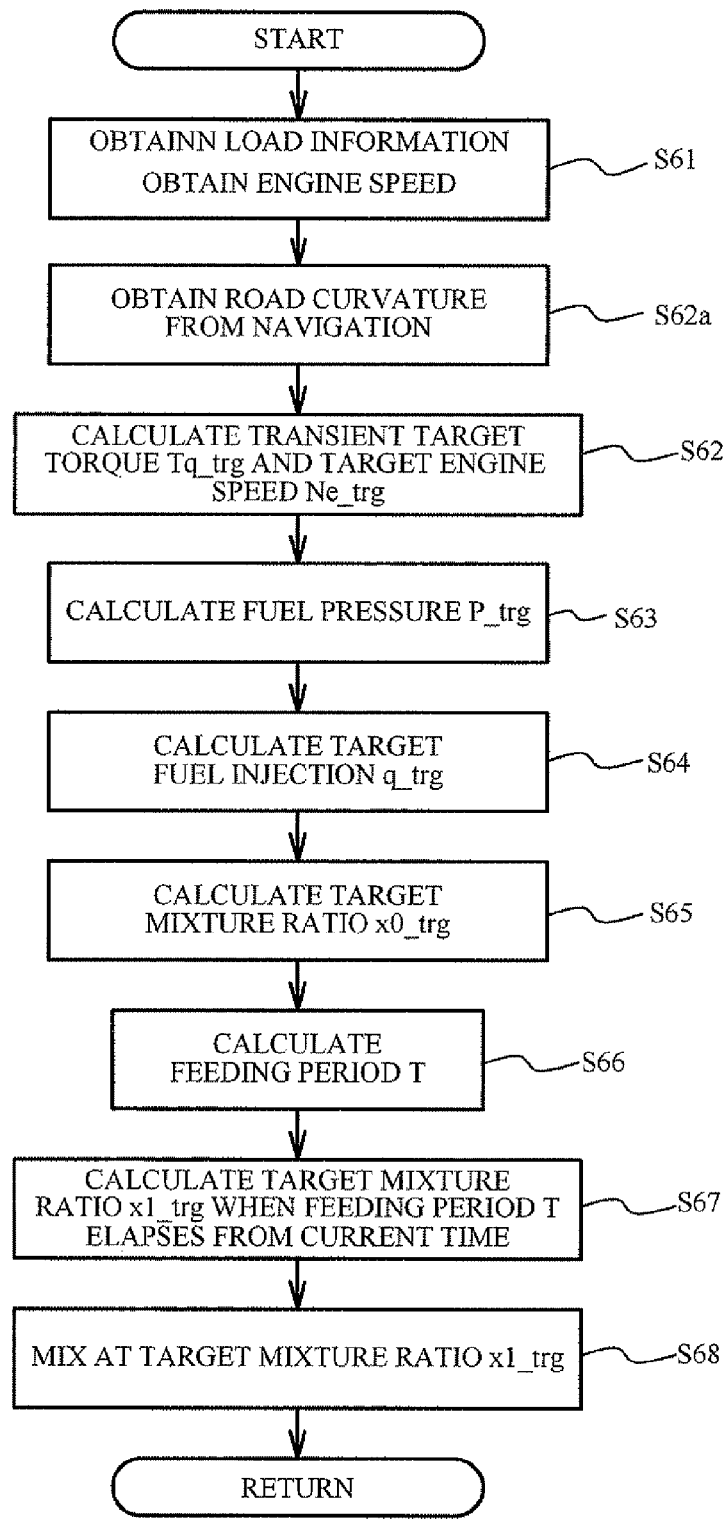
FIG. 13 is a flowchart of a seventh variation of the fuel supply control performed by the ECU.

Next, a seventh variation of the fuel supply control performed the ECU 17 will be described. FIG. 13 is a flowchart of the seventh variation of the fuel supply control performed by the ECU 17.

The ECU 17 obtains the curvature R of the road based on the information from the navigation device 50 after performing the process in step S61 (step S62a). Next, the ECU 17 calculates the transient target torque Tq_trg and the target engine speed Ne_trg based on the curvature R of the road, the engine speed Ne, and the load information (step S62).

After that, the ECU 17 performs the processes in steps S63 to S68.

Figure 14:
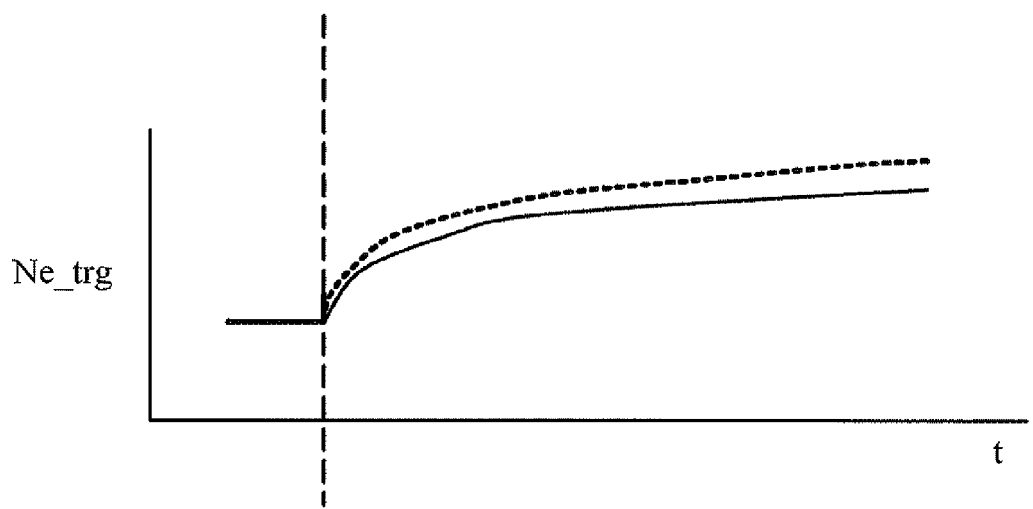
FIG. 14 is a timing chart illustrating the target engine speed calculated by the ECU in cases where curvatures of roads are different.

FIG. 14 is a timing chart illustrating the target engine speed Ne_trg calculated by the ECU 17 in cases where the curvatures R of the road are different. In FIG. 14, a solid line indicates a case where the curvature R of the road is high, and a dotted line indicates a case where the curvature R of the road is low. In such a way, the ECU 17 calculates the target engine speed Ne_trg to be lower as the curvature R of the road is higher. The ECU 17 control the target mixture ratio to be decreased as the calculated target engine speed Ne_trg is lower. Thus, the target engine speed Ne_trg is calculated in consideration of the curvature R of the road, thereby improving the accuracy in the calculation of the target engine speed Ne_trg. This improves the accuracy in the calculation of the target mixture ratio, thereby preventing the emission from being degraded.

Figure 15:
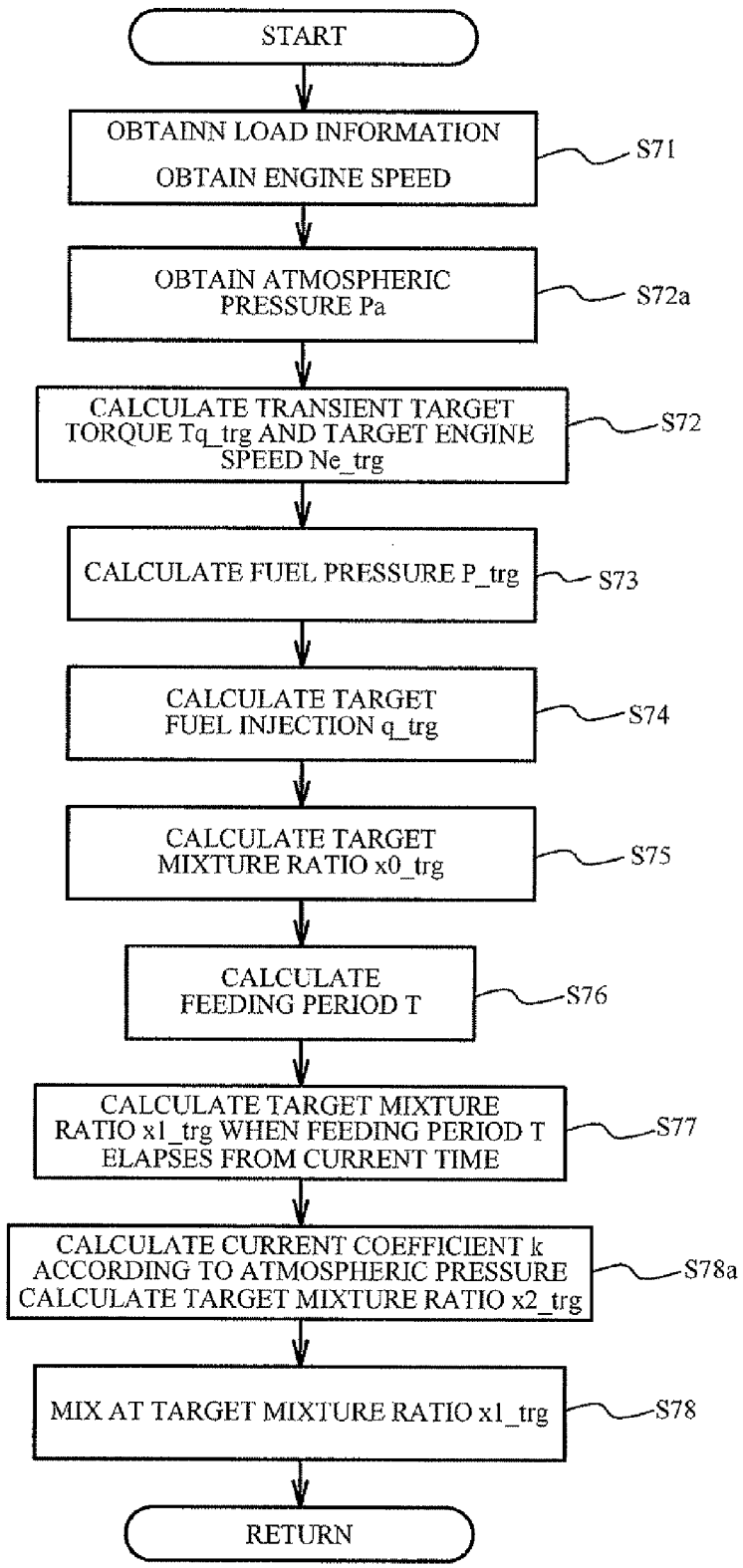
FIG. 15 is a flowchart of a eighth variation of the fuel supply control performed by the ECU.

Next, an eighth variation of the fuel supply control performed by the ECU 17 will be described. FIG. 15 is a flowchart of the eighth variation of the fuel supply control performed by the ECU 17.

The ECU 17 obtains an atmospheric pressure Pa based on output signals from the atmospheric pressure sensor 36 after performing the process in step S71 (step S72a). Next, the ECU 17 performs processes in steps S72 to S77.

Figure 16:
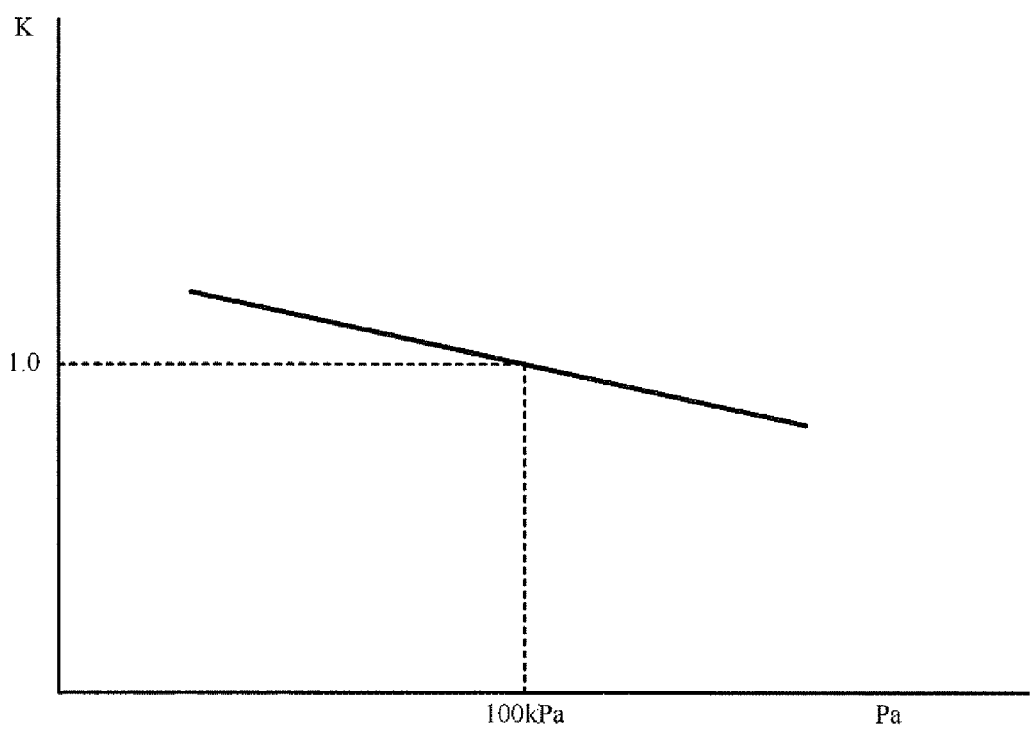
FIG. 16 is a map to calculate a correction coefficient.

The ECU 17 calculates the correction coefficient K based on the atmospheric pressure Pa, and then calculates the target mixture ratio x2_trg (step S78a). The correction coefficient K is a coefficient to correct the target mixture ratio x1_trg. FIG. 16 is a map for calculating the correction coefficient K. This map is stored beforehand in the ROM of the ECU 17. In this map, the vertical axis indicates the correction coefficient K, and the horizontal axis indicates the atmospheric pressure. This map defines that the correction coefficient K is higher as the atmospheric pressure is lower.

The target mixture ratio x2_trg is obtained by multiplying the target mixture ratio x1_trg by K. Thus, the target mixture ratio x2_trg is a value in consideration of the atmospheric pressure. In such a manner, the ECU 17 increases the target mixture ratio x2_trg as the atmospheric pressure is lower. The reason is as follows. Oxygen concentration in the atmosphere is lower as the atmospheric pressure is lower. If the oxygen concentration is low, the fuel which cannot combine with oxygen increases to readily generate smoke. Thus, the mixture ratio is increased, thereby promoting the oxidation of the fuel, and then preventing the generation of smoke.

While the exemplary embodiments of the present invention have been illustrated in detail, the present invention is not limited to the above-mentioned embodiments, and other embodiments, variations and modifications may be made without departing from the scope of the present invention.

The invention claimed is:

1. An engine system comprising:
    a mixture portion capable to mixing a first liquid as a main fuel with a second liquid at a predetermined mixture ratio;
    an engine to which a mixed fuel produced by mixing the first liquid with the second liquid is fed from the mixture portion; and
    a control portion controlling the mixture ratio of the mixed fuel to be a target mixture ratio based on a driving state of the engine,
    wherein: the first liquid is a light oil or a gasoline;
    the second liquid is a water or an enthanol;
    the control portion controls the target mixture ratio based on a feeding period from the time when the mixed fuel is fed from the mixture portion to the time when the mixed fuel arrives at the engine; and
    the control portion controls the target mixture ratio to be zero when a transmission is in a reverse state.

2. The engine system of claim 1, characterized in that the control portion increases the target mixture ratio of the second liquid to the first liquid as the gear ratio of a transmission is higher.

3. The engine system of claim 1, wherein the control portion increases the target mixture ratio of the second liquid to the first liquid when the engine is accelerated.

4. The engine system of claim 1, wherein the control portion increases the target mixture ratio of the second liquid to the first liquid as an atmospheric pressure is lower.

5. The engine system of claim 1, further comprising a fuel injection valve,
   wherein the control portion controls the target mixture ratio based on the feeding period from the time when the mixed fuel is fed from the mixture portion to the time when the mixed fuel is fed to the fuel injection valve.

6. The engine system of claim 1, wherein the control portion calculates a target engine speed and a target fuel injection quantity based on an engine speed and an engine load, and calculates the feeding period based on the target engine speed and the target fuel injection quantity.

* * * * *